US011363798B2

(12) United States Patent
Oates

(10) Patent No.: US 11,363,798 B2
(45) Date of Patent: Jun. 21, 2022

(54) POSITION CONTROL OF PET BOWL

(71) Applicant: PET MATE LIMITED, Hersham (GB)

(72) Inventor: Jeremy Oates, London (GB)

(73) Assignee: PET MATE LTD., Surrey (GB)

( * ) Notice: Subject to any disclaimer, the term of this patent is extended or adjusted under 35 U.S.C. 154(b) by 0 days.

(21) Appl. No.: 16/506,335

(22) Filed: Jul. 9, 2019

(65) Prior Publication Data
US 2019/0343073 A1 Nov. 14, 2019

Related U.S. Application Data

(62) Division of application No. 15/229,623, filed on Aug. 5, 2016, now abandoned.

(30) Foreign Application Priority Data

Aug. 6, 2015 (GB) ...................... 1513910

(51) Int. Cl.
*A01K 5/02* (2006.01)
*A01K 5/01* (2006.01)
*G01D 5/30* (2006.01)

(52) U.S. Cl.
CPC .......... *A01K 5/0275* (2013.01); *A01K 5/0114* (2013.01); *A01K 5/0291* (2013.01); *G01D 5/305* (2013.01)

(58) Field of Classification Search
CPC ....... A01K 5/02; A01K 5/0114; A01K 5/0142
See application file for complete search history.

(56) References Cited

U.S. PATENT DOCUMENTS

| | | | | |
|---|---|---|---|---|
| 3,935,837 A | * | 2/1976 | Mulhern | A01K 5/0291 119/51.12 |
| 4,248,175 A | | 2/1981 | Navarro | |
| 4,249,483 A | | 2/1981 | Sobky | |
| 4,450,790 A | | 5/1984 | Stansbury, Jr. | |
| 4,501,229 A | | 2/1985 | Williamson | |
| 4,617,874 A | | 10/1986 | Zammarano | |
| 4,671,210 A | | 6/1987 | Robinson et al. | |
| 4,805,560 A | | 2/1989 | Knego et al. | |
| 4,981,106 A | | 1/1991 | Nagatomo | |
| D317,666 S | | 6/1991 | Haynes | |
| 5,150,664 A | * | 9/1992 | Kirk | A01K 5/0291 119/51.12 |
| 5,176,103 A | | 1/1993 | Reid et al. | |
| 5,222,461 A | * | 6/1993 | Haynes | A01K 5/0233 119/51.12 |
| 5,377,620 A | | 1/1995 | Phillipi | |
| 5,467,738 A | | 11/1995 | Cass | |
| 5,492,083 A | * | 2/1996 | Holladay | A01K 5/0114 119/52.1 |
| 5,975,024 A | | 11/1999 | Sheaffer | |
| 6,349,671 B1 | | 2/2002 | Lewis et al. | |

(Continued)

*Primary Examiner* — Michael H Wang
(74) *Attorney, Agent, or Firm* — Fay Sharpe LLP

(57) ABSTRACT

An automatic pet feeder, comprising a bowl with a plurality of compartments, a cover and a sensor, the bowl being rotated relative to the cover to sequentially expose each the compartments, the bowl having location regions detectable by the sensor, each location region having a first edge and a second edge, the motor being driven at a first speed until the first edge is detected, and the motor being driven at a second, slower speed until the second edge is detected, stopping the motor.

6 Claims, 11 Drawing Sheets

(56) References Cited

U.S. PATENT DOCUMENTS

| | | |
|---|---|---|
| 6,766,766 B1 | 7/2004 | Elliot |
| 7,650,855 B2 * | 1/2010 | Krishnamurthy ........ A01K 5/02 |
| 8,424,489 B2 | 4/2013 | Desrosiers |
| 8,800,488 B2 * | 8/2014 | Stone .................. A01K 5/0291 |
| | | 119/51.01 |
| 9,737,049 B2 | 8/2017 | Trottier et al. |
| 2005/0066905 A1 | 3/2005 | Morosin et al. |
| 2005/0224003 A1 | 10/2005 | Yin et al. |
| 2005/0252457 A1 | 11/2005 | Morosin et al. |
| 2007/0119378 A1 * | 5/2007 | Fick ........................ A01K 5/00 |
| | | 119/52.1 |
| 2014/0090601 A1 | 4/2014 | Stone |
| 2014/0182518 A1 | 7/2014 | Boehm |
| 2016/0157461 A1 * | 6/2016 | Hill ..................... A01K 5/0114 |
| | | 119/51.01 |
| 2017/0042116 A1 * | 2/2017 | Lindskov ............. A01K 5/0114 |
| 2017/0290290 A1 * | 10/2017 | Trottier ................... A01K 5/02 |
| 2017/0295750 A1 | 10/2017 | Trottier et al. |

\* cited by examiner

POSITION CONTROL OF PET BOWL

CROSS-REFERENCE TO RELATED APPLICATIONS

This application is a divisional of and claims priority to co-pending U.S. application Ser. No. 15/229,623 filed Aug. 5, 2016, which claims priority to, and the benefit of, Great Britain Patent Application No. GB 1513910.8, filed Aug. 6, 2015, the entirety of which is hereby incorporated by reference as if fully set forth herein.

The present specification relates to a position control of pet bowl or the like, that is, the control system for ensuring that a rotating bowl accurately stops at particular positions.

Automatic pet feeding bowls often comprise a bowl radially divided into compartments, with a housing that covers the bowl except for one of the compartments, which a pet can access through an aperture. A timing and control system periodically rotate the bowl so as to position each compartment in turn, so that a pre-filled bowl can provide several meals for the pet at regular intervals.

Some dogs and cats will overeat if given the opportunity, which can lead to undesirable vomiting in the short term (and of course weight gain in the longer term). Also, some dogs and cats will go to great lengths for additional food. If the bowl is not accurately positioned, and the partitions between the bowl compartments are not completely aligned with the aperture, a pet will often smell the food in the next compartment, and try to force the bowl to turn to access it, or try to remove or break the housing. It is therefore desirable that the bowl is accurately positioned.

The bowl is rotated by a motor, for example driving the spindle. One method of controlling the position of the bowl, is to include notches or tabs on the underside, angularly positioned in a manner corresponding to the bowl compartment partitions. A sensor picks up when the notch or tab has reached the appropriate position, and stops the motor. The sensor may, for example, comprise a light of infrared source and detector, set up so that light is either transmitted through the notch to the sensor, or to reflect onto the sensor except where the notch is (and a corresponding arrangement for a tab).

This arrangement requires precise tolerances. The bowl will generally rotate after the motor has stopped, due to the angular momentum of the bowl. The amount of additional rotation depends on the speed and mass of the bowl, which changes with variations of battery voltage, amount of food and friction. Any lag in processing the signal and cutting the motor's rotation will cause the bowl to overshoot. It is also possible that the bowl does not rotate sufficiently, so that not all the food is easily accessible.

The object of the present invention is to provide an accurate position control system. Other objects of the invention will become clear from the description.

According to the present invention, there is provided a pet feeder according to any of the independent claims.

The invention will now be described, by way of example, with reference to the drawings, of which FIG. 1 is a perspective view of the top of the assembled automatic pet feeder;

Figure 1:
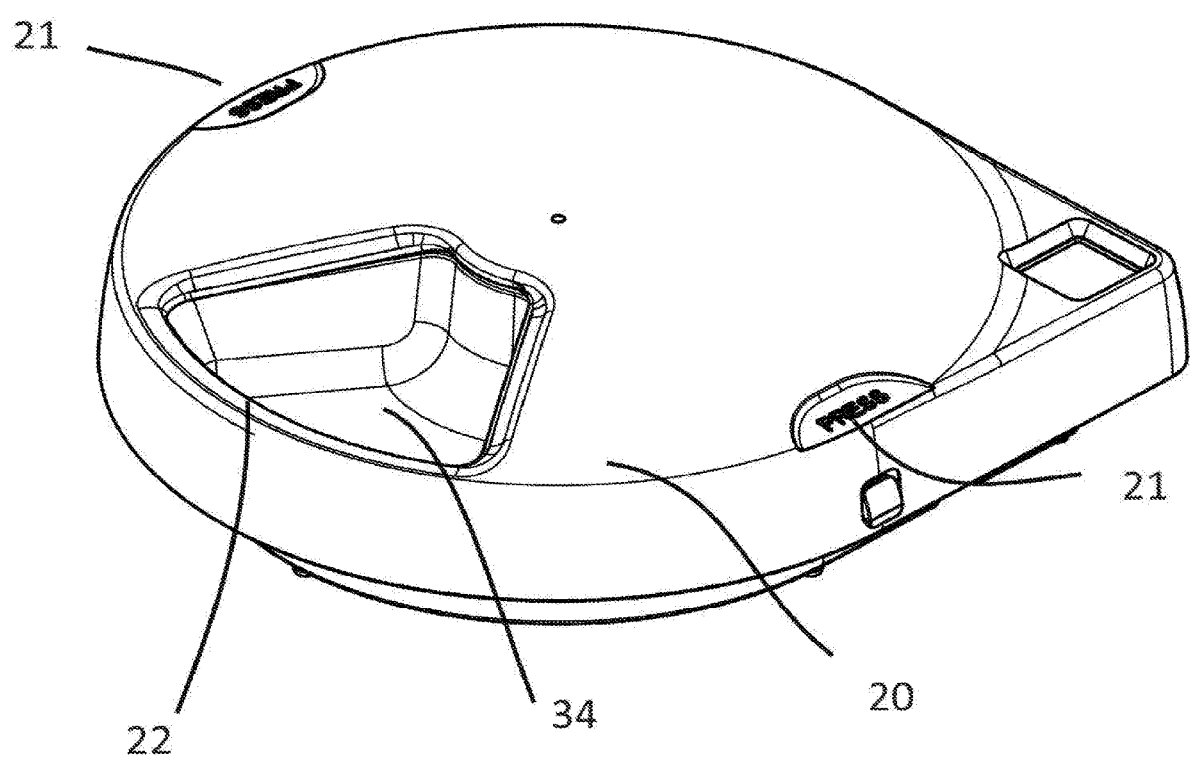
Figure 2:
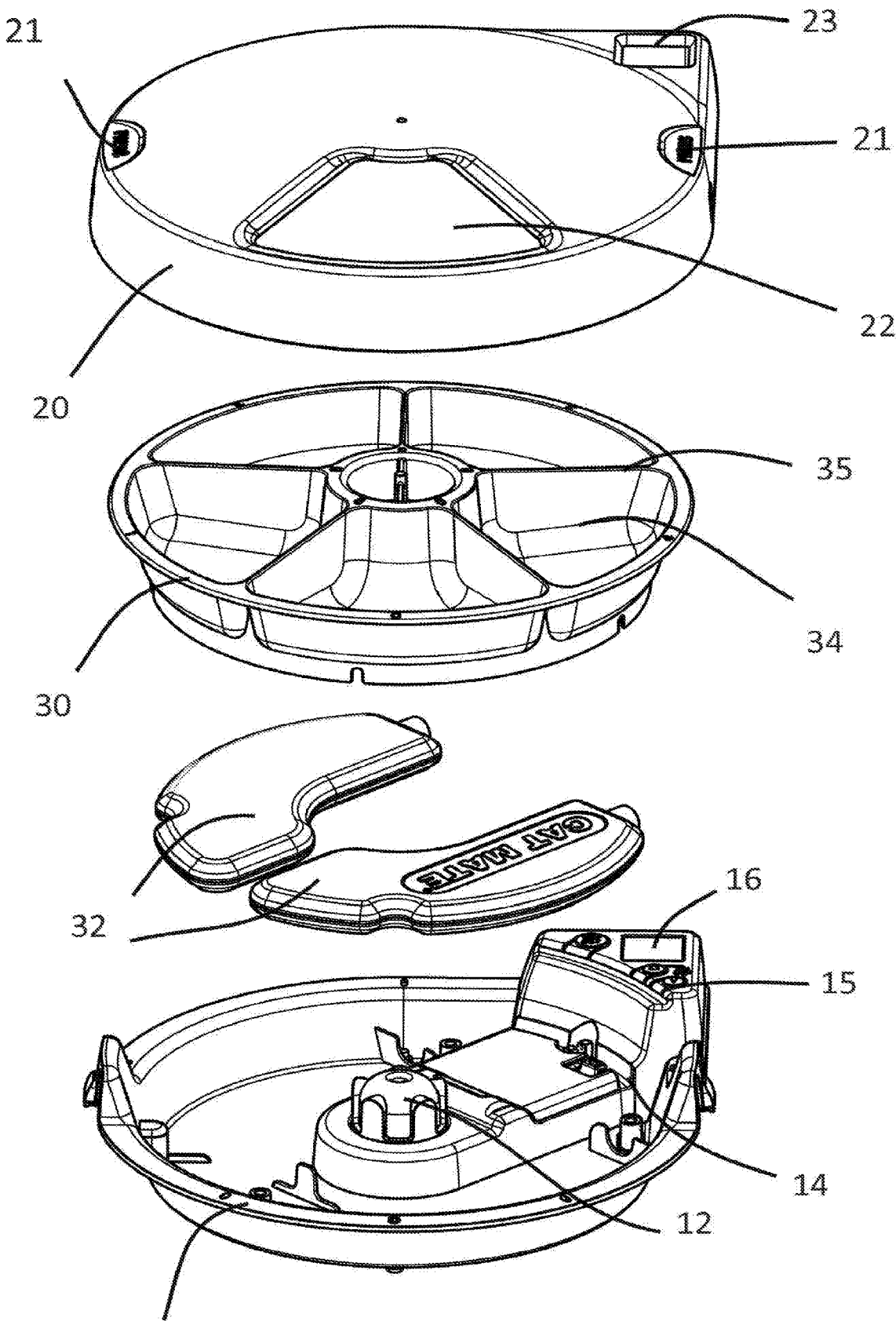
FIG. 2 is an exploded perspective view of the automatic pet feeder.

Referring to FIGS. 1 and 2, the automatic pet feeder comprises a main body 10, a cover 20, and a bowl 30; cooling elements 32 may also be included, such as a material with a high heat capacity which may be included after having been placed in a freezer, and which fits beneath the bowl to keep the pet food chilled.

The main body includes a driving spindle 12, on which the bowl is placed, and which engages with shaped socket 31 (FIG. 3) on the bottom of the bowl, so that when the spindle 12 is rotated by an angle by a motor (not shown), the bowl also turns by the same angle.

The bowl 30 is divided into compartments 34, separated by partitions 35. In this example, there are five compartments similar compartment, each subtending an angle of 72°, though of course this can be varied.

The cover then covers the bowl, except for an aperture 22, which is generally segment-shaped, and corresponds to the compartments 34 of the bowl 30.

Figure 3:
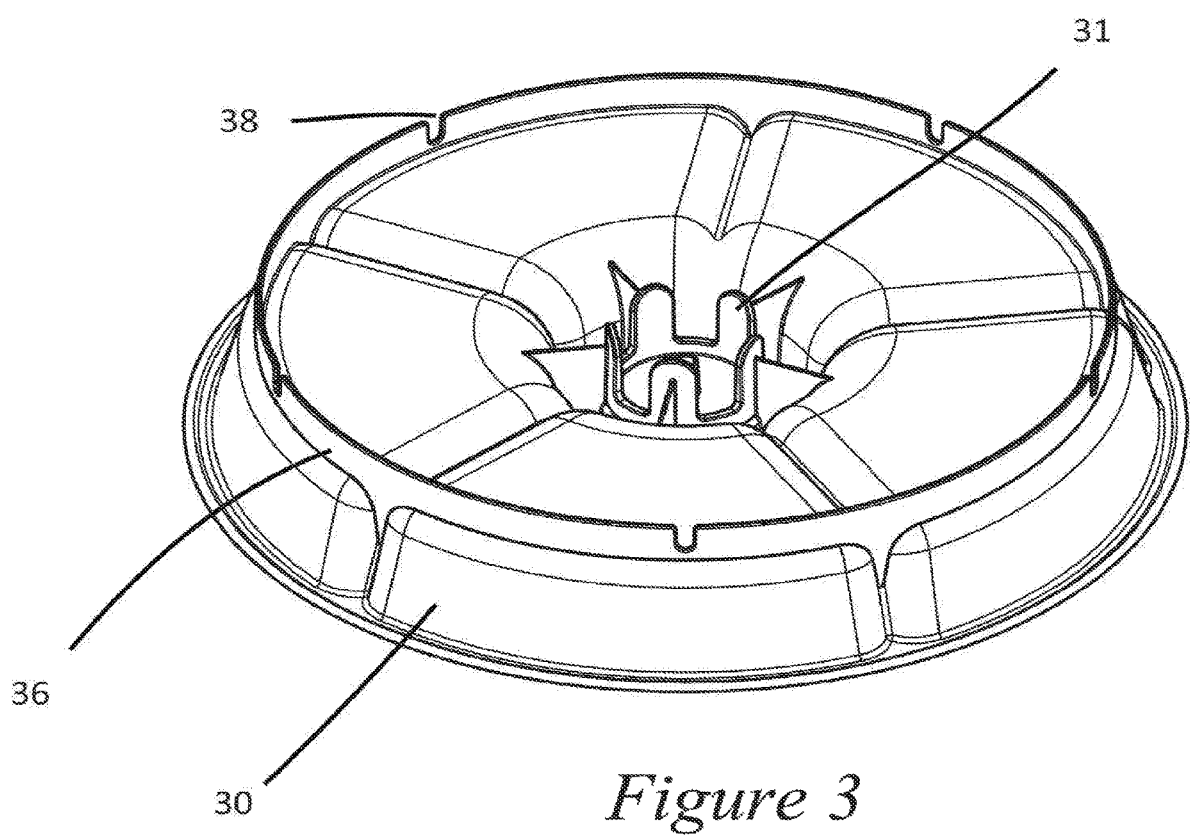
FIG. 3 is a perspective view of the underside of the bowl.

Referring to FIG. 3, the underside of the bowl features a vertically depending rigid circular skirt or rim 36, concentric with the centre of rotation of the bowl. The bottom surface of the rim is interrupted by five notches 38 which are equally angularly spaced. Referring back to FIG. 2, when the bowl is located its socket 31 locating on the spindle 12, part of the downward hanging rim slides into a curved slot 14 which includes a sensing means.

Figure 4A:
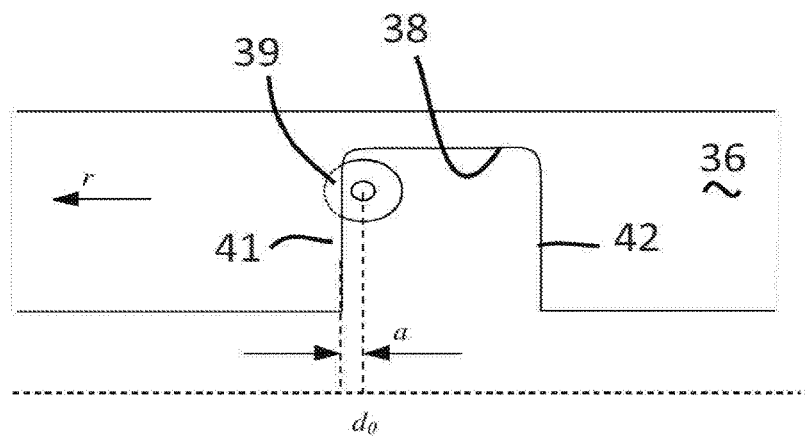
FIGS. 4a and 4b is a diagrammatic view of the sensor and bowl detail.
Figure 4B:
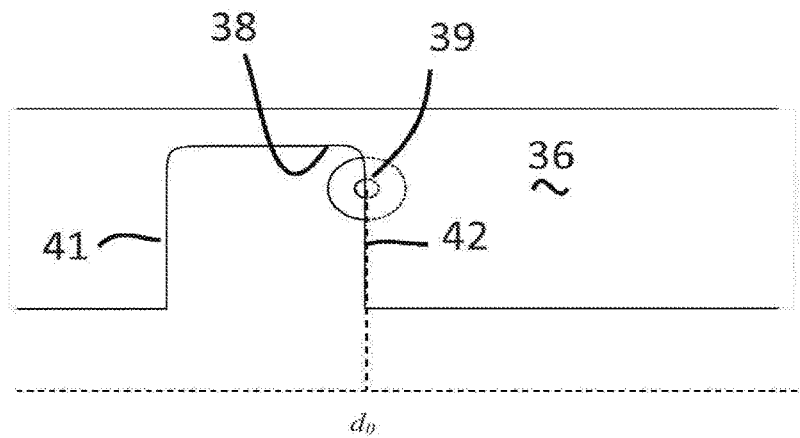

Referring also to FIGS. 4a and 4b, the sensing means comprises an IR LED 39 located on one side of the curved slot, and a IR sensor located on the other side of the curved slot, so that IR radiation from the IR LED 39 is emitted directly into the IR sensor when the path between them is not impeded.

The depth of rim 36, and the position of the IR sensing means in the curved slot, is such that the rim 36 blocks the emission from the IR LED 39 and prevents the IR radiation reaching the IR sensor, except when the notches 38 are located in front of the IR LED 39.

Figure 5:
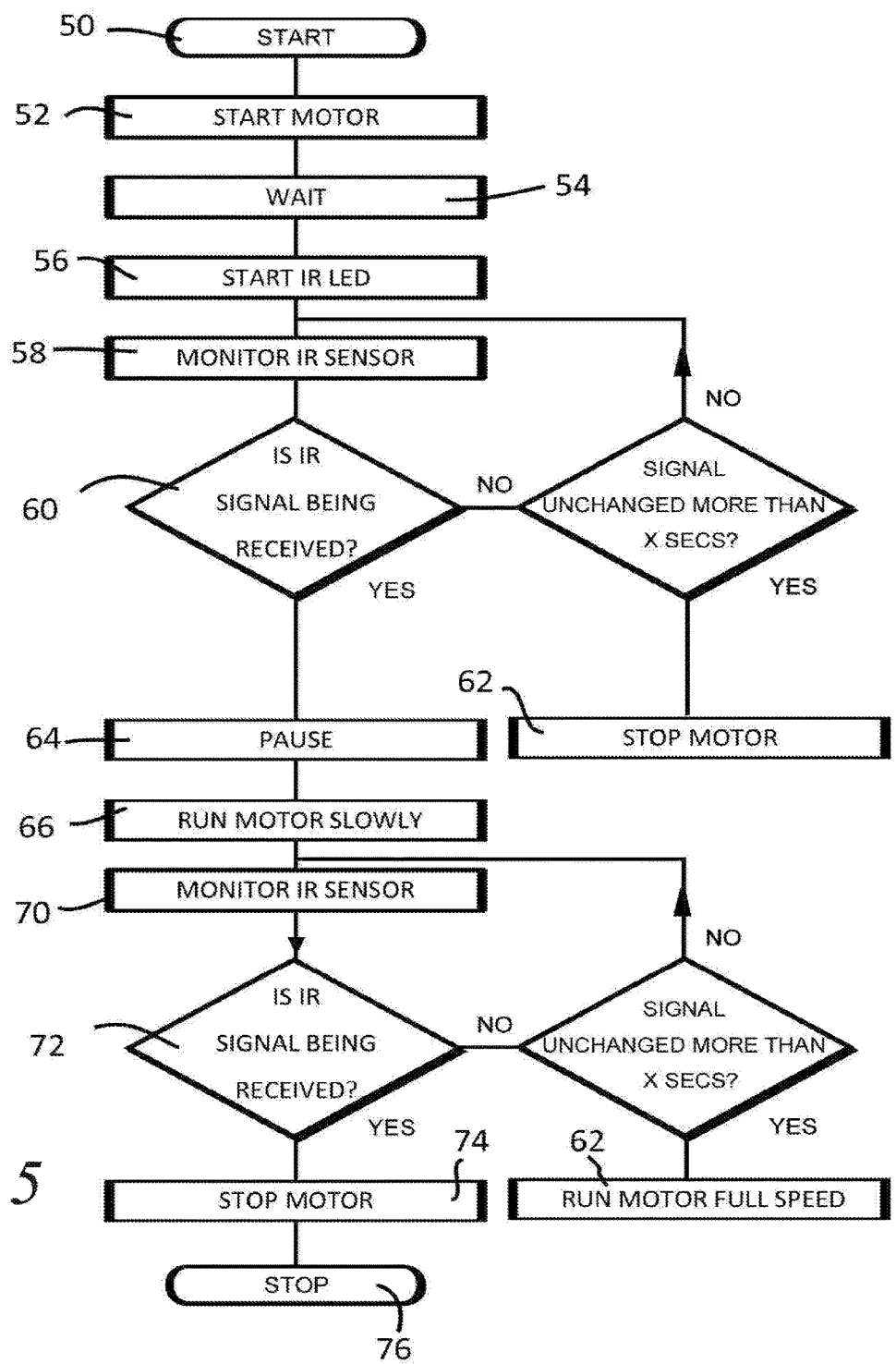
FIG. 5 is a flowchart showing the process

Referring to FIG. 5, the operation of the position control method will now be described for the rotation from one compartment to a subsequent compartment. When a timer circuit indicates that the bowl should be rotated to reveal the next compartment to the pet, the rotation process is started 50 motor is activated to start turning the bowl 52. After a short predetermined time period 54, the IR LED 39 (FIG. 4a) is activated 56 and the IR sensor is monitored (the OR sensing may be continuous or activated as required).

The motor requires more power to start the bowl moving than to maintain its rotation once it has started moving. Therefore, once the motor has started moving 50, the power (and speed) supplied to the motor can be reduced 55. In the following description, where the motor stops and restarts (or reverses in direction) it is to be understood that the motor will need 100% power to start it moving again, which can thereafter be reduced. The bowl should be rotated with sufficient speed to allow the new full bowl compartment to be fully positioned before the cat or dog can begin to feed. The motor will typically start at a first speed, and then continue at a somewhat slower second speed. However, the system may also be implemented where the initial speed in maintained at this step of the process.

Slower speeds may conveniently be achieved by a pulse width modulation of the motor power, providing that the time period of the pulse waveform is sufficiently small that the motor speed can be considered constant.

Referring to FIG. 4a, each notch 38 has a leading edge 41 and a trailing edge 42. As the bowl 30 is rotated in direction r, the notch leading edge 41 passes the IR LED to uncover the IR LED 39.

Referring back to FIG. 5, the output from the IR sensor is monitored 60. When a signal is received, indicating that the leading edge 41 has passed the IR LED, the motor is slowed 66 to a third speed (i.e. significantly slower than the second speed).

Depending on the angular momentum of the bowl (whose effects can vary with variation in tolerances, wear, and amount of food in the bowl and amount of play of the components), and variation and drift in the circuit, resolution of the sensing time periods, if the bowl is simply stopped at a certain position (such as when the leading edge 41 is detected crossing the IR LED 39 at $d_0$, the bowl may overshoot the intended position by a variable amount distance a. If the resting position of the bowl were based on this, there would be a corresponding angular position error.

Referring to FIGS. 4a and 5, the output from the IR sensor is again monitored, and now when the signal stops 72, indicating that the trailing edge 42 has passed the IR LED, the motor is stopped 74 and the rotation process finishes 76 until the next rotation event as indicated by the timer.

At this third slower speed, the trailing edge 42 will be more closely aligned with the overshoot the position $d_0$ of the IR LED 39. Since the bowl can be rotated at a far lower speed for a short angular displacement, the angular momentum of the bowl is less, and does not carry the bowl very far after the power to the motor has been switched off. Also, at this slower speed, the delays in sensing the IR LED signal and switching the motor translate to a much smaller angular error.

The placement of the trailing edges of the notch are positioned on the rim such that the coincidence of the trailing edge and the IR LED corresponds to the correct alignment of the cover aperture with the bowl compartment.

The sensing and position control circuit may now be switched off until next reactivated by the timer circuit. The predetermined time period between the start of activation of the IR LED and IR sensor during each rotation event ensures that change in signals from the earlier notch are discounted.

The width of the notch 38—which is the distance between the leading edge 41 and the trailing edge 42—is chosen so that the IR LED is still forward of the trailing edge even after the overshoot from the leading edge.

As an optional embodiment (not shown), if the notch is such that the a rim overshoots to such an extent that the IR LED passes the trailing edge—which would be detectable as the signal disappearing—the motor may be controlled to run slowly in reverse, until the IR LED is detected again, at which point the motor is stopped and the trailing edge is at the correct position $d_0$.

A number of additional features may optionally be included to make the operation of the feeding bowl more resilient. Referring again to FIG. 5, if no IR signal is detected 60, and the signal is unchanged for x seconds 61, the motor is stopped 62. This may occur for when something is obstructed the turning of the bowl, for example a cat has stuck its paw in the bowl. In such a case, the motor should stop and the process ends, to allow the cat to free itself. An audible alarm signal and/or a fault display may be activated to notify the user that there is a fault.

Another optional feature can be implemented to counteract faults with the bowl's rotation after the leading edge of the notch has been passed and the speed has been reduced. If a large amount of food is placed in the bowl, and/or if the motor or parts are worn, the slower speed of the motor may not be sufficient to move the bowl, and due to difference in motor power between initiating and maintaining movement (as previous discussed), the bowl will not move. If a continuous IR signal is detected 64 for more than y seconds, this may indicate that the bowl has stopped moving because of insufficient motor power. In this event, the motor power is briefly restored to full power 65, before being reduced again 67, which should progress the bowl.

The output from the IR sensor is again monitored 69, and when the signal stops, indicating that the trailing edge 42 has passed the IR LED, the motor is stopped 70 and the rotation process finishes 71 until the next rotation event as indicated by the timer.

If no IR signal is detected and the signal is unchanged for z seconds 73, it could indicate the motor is stopped 62. This could occur for the same reason as discussed for steps 61, 62, 63, and similarly the motor should stop and the process ends. As for the previous process, an audible alarm signal and/or a fault display may be activated to notify the user that there is a fault.

Suitable time periods x, y and z will depend principally on the rotational speeds, and dimensions and geometry of the bowl and other factors, and may be conveniently determined by experiment.

Figure 6:
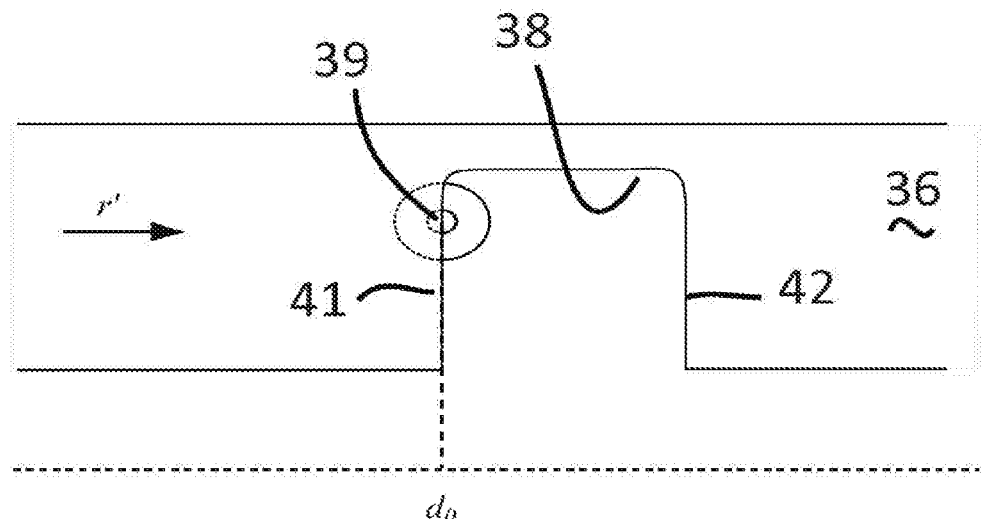
FIG. 6 is a diagrammatic view of another embodiment of the sensor and bowl detail.
Figure 7:
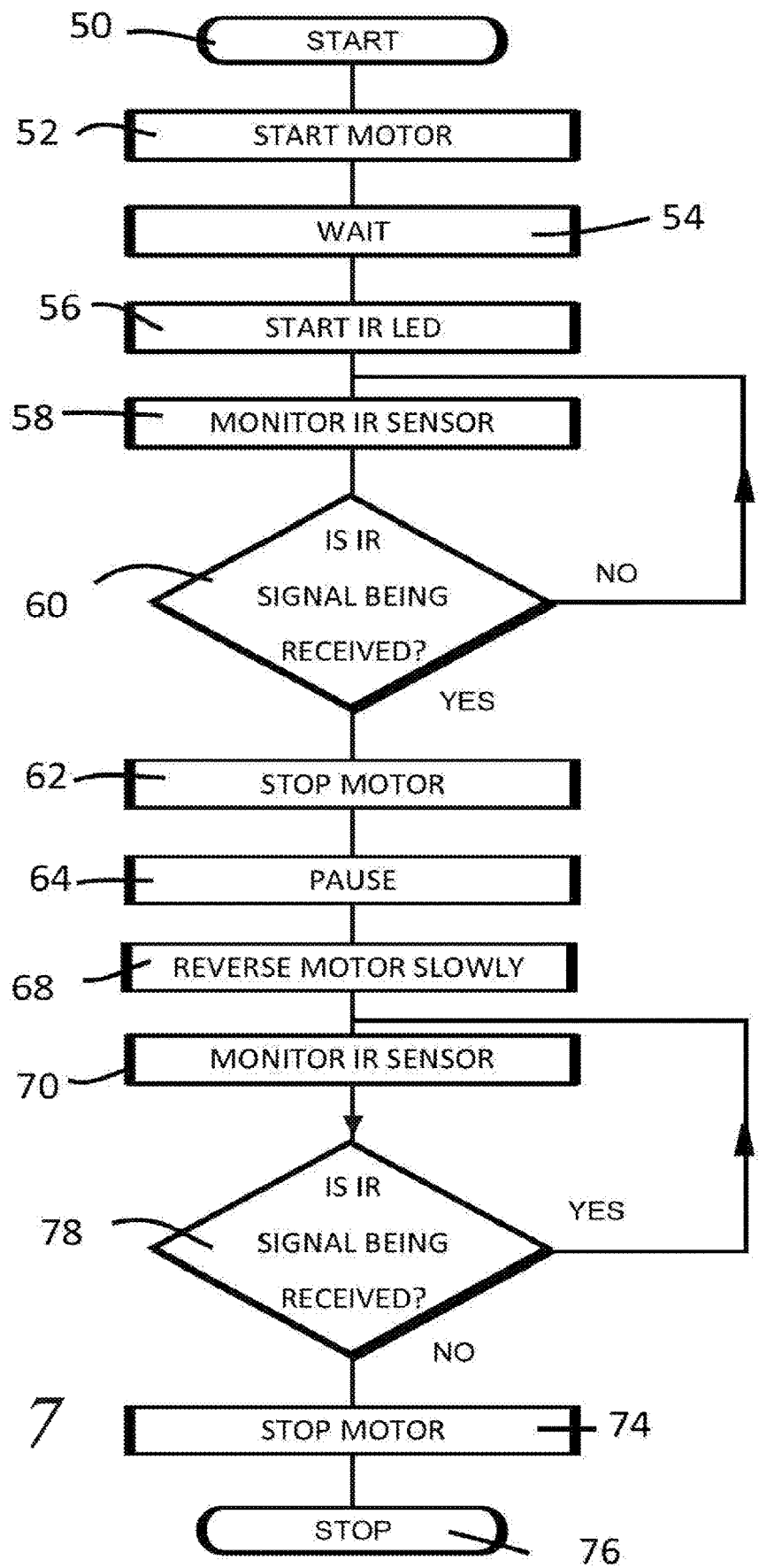
FIG. 7 is a flowchart showing another embodiment of the process.
Figure 8:
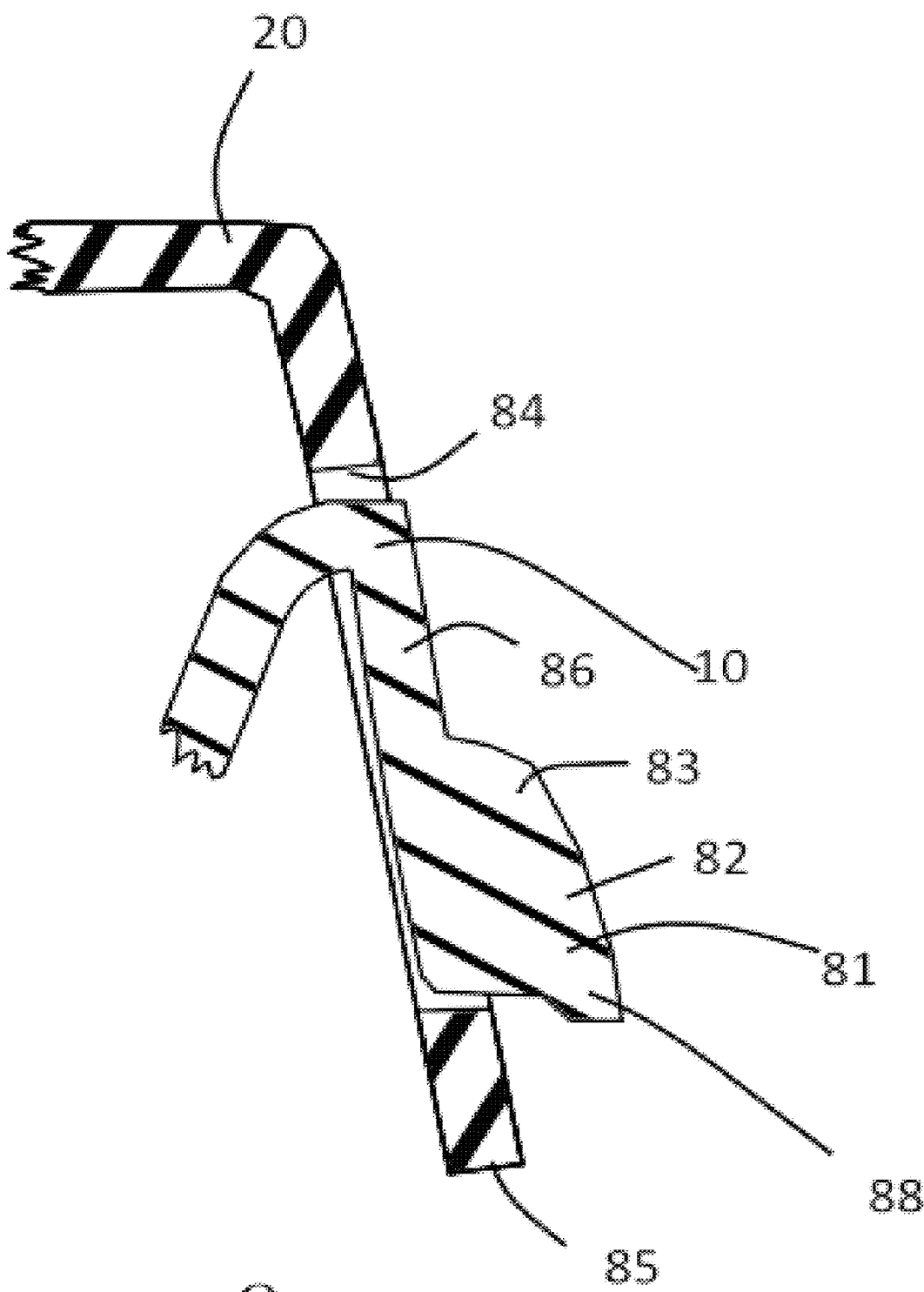
FIG. 8 is a partial sectional view of portions of a main body and a cover of the pet feeder.

Referring to FIGS. 6 and 7, in an alternative embodiment, the leading edge 41 of the notch 36 has exposed the IR LED 39, the IR signal has been detected 60, and the motor is stopped 62, as for the previous example. Now though, the motor is reversed (i.e. as indicated by arrow r') at a slow speed 68, until the IR signal is no longer detected 78. When the IR signal is no longer detected 78, the motor is stopped 74.

In a similar way to the previous embodiment, at this slower speed, the leading edge 41 is now more closely aligned with the position $d_0$ of the IR LED 39, for the same reasons given in that instance. The placement of the leading edge of the notch is positioned on the rim such that the coincidence of the leading edge and the IR LED 39 correspond to the correct alignment of the cover aperture with the bowl compartment.

Rather than a notches being presented in a solid skirt, the same principles may be applied to a number of tabs depending from the bowl, corresponding to the tabs, without any rim. The detection regime will then simply be reversed, with the IR signal being cut off when the leading edge of the tab is reached, and the signal being detectable when the trailing edge passes the IR LED.

In a similar manner to that described in the previous embodiment, when no IR signal is detected 60 for a period of x seconds 61, the motor is stopped 62, and the process ended, and again when the bowl is being reversed, a continuous signal having a duration greater than y seconds 79 causes the motor to be stopped and the process to end. Alerts and/or alarms may be activated to indicate possible obstruction or fault to the user.

The principles of these embodiments may also be reproduced using a IR LED and IR sensor on the same side of the rim (or the same side of the tab), so that the sensor monitors the reflection (or absence of reflection) of the IR LED. Further, the reflection and non-reflection may be achieved using different finishes rather than breaks in the material.

It has already been noted that a pet will try and manipulate the pet feeder to try to access the compartments having food in them before the programmed time. A pet will often exert considerable force using its mouth, paws and claws, and some pets can prove surprisingly dextrous. Further, if a pet manages to open or force off the cover of a pet feeder by chance, it will recall this, and repeat the process on subsequent occasions.

Accordingly, the cover and main body are designed to make it difficult for a pet to interfere with the pet feeder. Referring to FIGS. 1, 2 and 8 to 11 the cover 20 attaches to the main body 10 by means of two or more similar latches 82, which are situated on opposite sides of the pet feeder. The cover 20 has two apertures 84 with which each latch 82 engages in a resilient press-release manner. The latch 82 comprises a button 81 supported on a resilient web 86 depending from the main body. The button has a curved upper surface 83, and a lower lip 88. The material of the web on which the button depends is somewhat flexible and resilient, and when the cover 20 is positioned on the main body and the latch is aligned with the aperture, the latch is biased so that the button 81 protrudes through the aperture 84. Vertical movement of the latch is constrained by the upper and lower surfaces of the aperture, so that when the cover is lifted for example, the main body and cover are secured together and the main body is also raised. Horizontal movement of the cover relative to the latch is constrained both by the two latches being arranged oppositely, and by the lower lip 88 of each latch, which catches against the lower ledge of the aperture 84.

Figure 9:
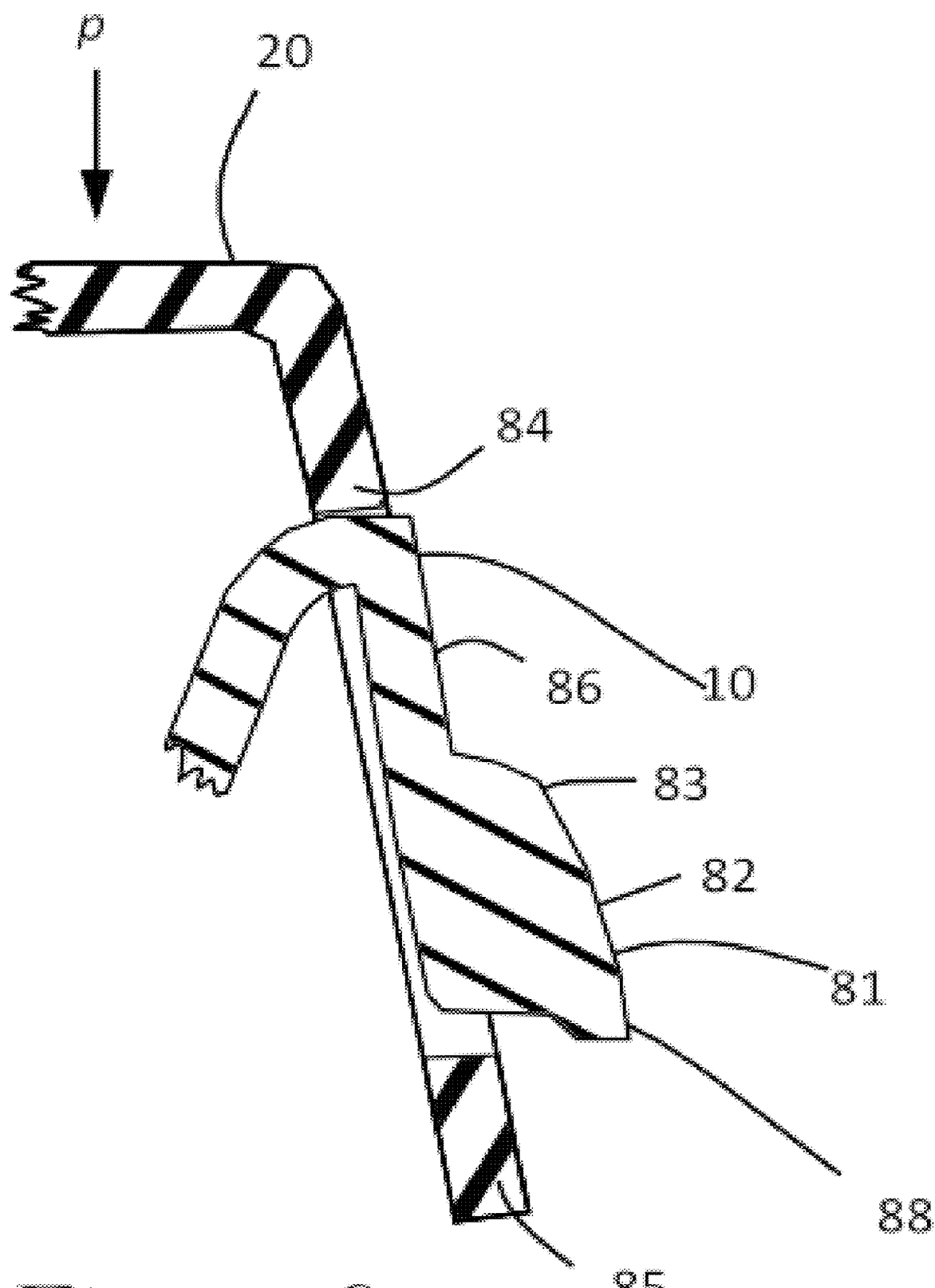
FIG. 9 is a partial sectional view of portions of the main body and the cover of the pet feeder.

Referring to FIG. 9, in order to release the cover from the main body and access all the compartments of the bowl (and disassemble the pet feeder), the cover 20 must be pressed downwards (as indicated by arrow p) so that the lip 88 of the button 81 can clear the lower edge of aperture 84. Referring to FIG. 1, indented regions 21 may be provided to indicate an optimal thumb position to the user to carry out this action.

Figure 10:
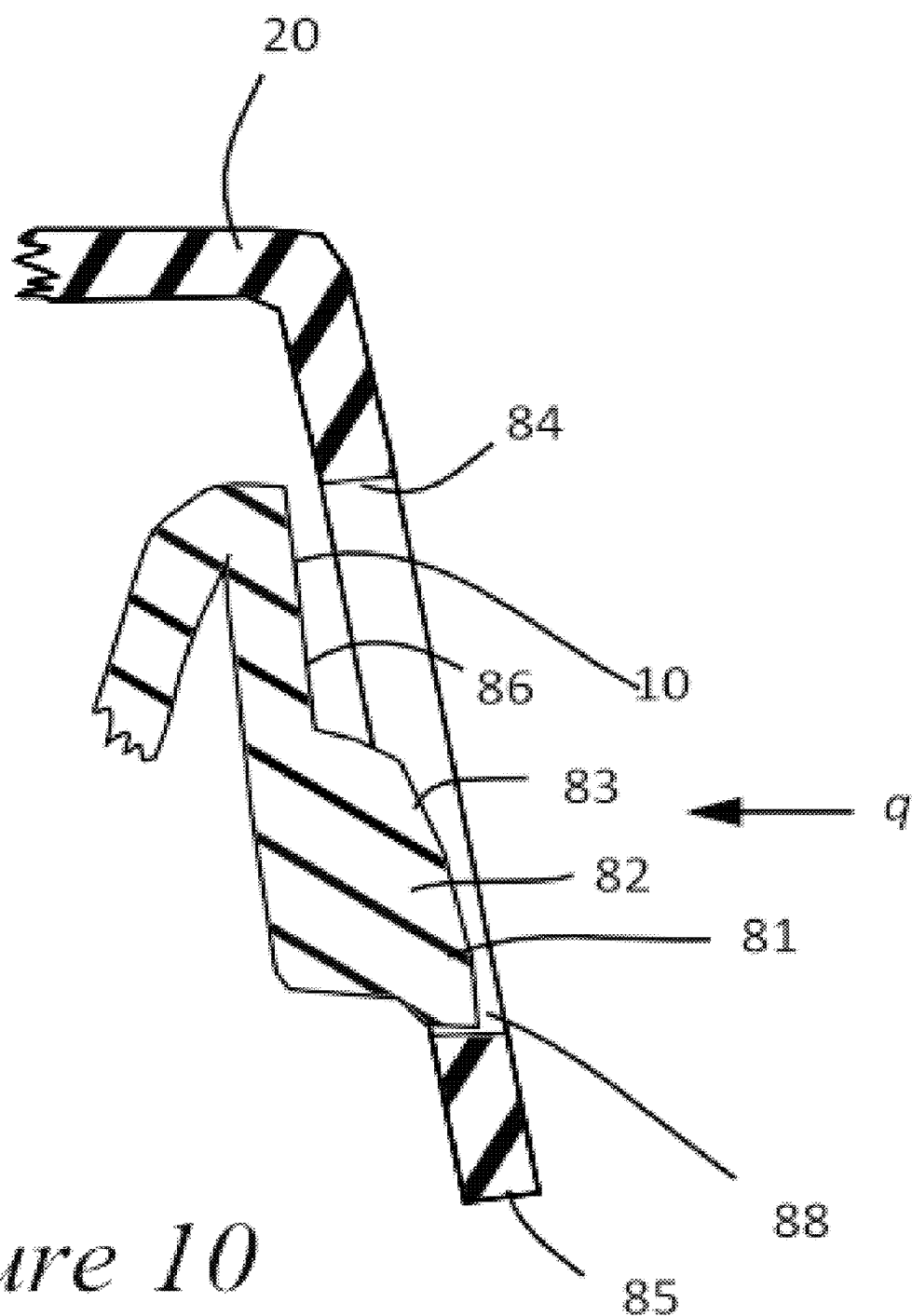
FIG. 10 is a partial sectional view of portions of the main body and the cover of the pet feeder.
Figure 11:
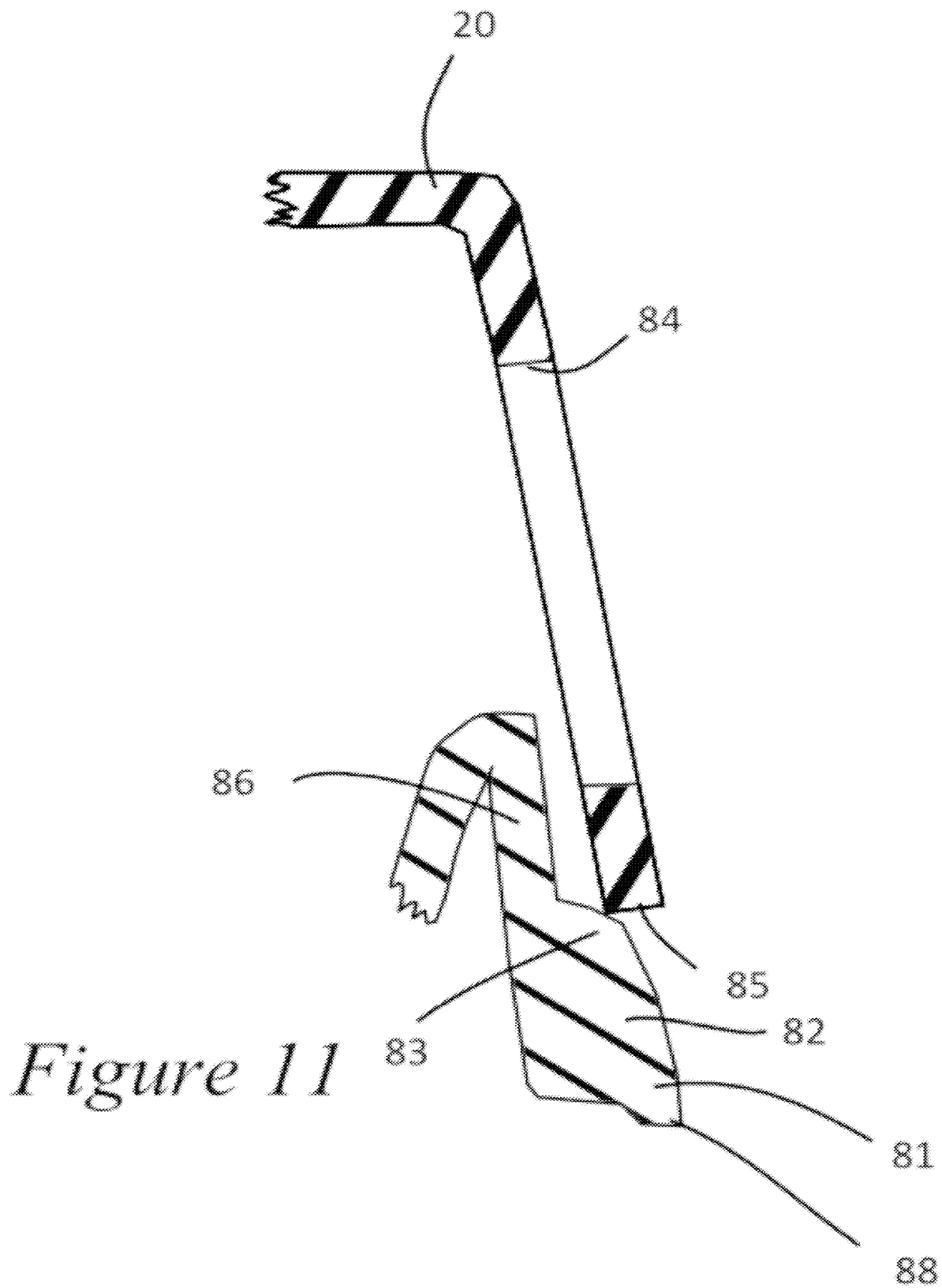
FIG. 11 is a partial sectional view of portions of the main body and the cover of the pet feeder.

Once this is done, referring to FIG. 10, each button 82 must be pressed inwards (in a direction indicated by arrow q). If the main body 10 is not supported from underneath, the lip 88 will catch on the lower ledge of the aperture 84, and the button 82 cannot be pressed through the aperture 84

Once the surface of the button has been pressed within the cover 20 on both sides, the cover 20 may be lifted off of the main body 10.

The cover 20 may be re-fitted to the main body 10 by simply orienting the cover relative to the main body, and then depressing the cover while the main body is supported. Referring to FIG. 10, as the cover is positioned, the lower edge 85 of the cover 20 bears against the curved surface 83 of the button 82, causing the latch 81 to deform inwardly. The latch 81 remains pressed inwards until the lip 88 clears the lower edge of aperture 84, at which point the latch 81 springs outwards, locking the cover 20 to the main body 10.

To remove the cover from the main body therefore requires that the cover is momentarily pressed and both latch buttons 82 are pressed inwardly (in opposite directions) simultaneously, while the main body is supported. Due to the distance between the two latches, it is difficult for a pet to reach them both simultaneously, let alone manipulate them in the required manner.

Rather than providing two diametrically opposed latches each engaging with an aperture in the cover as illustrated here, a single latch and cover may be provided, together with some sort of engaging profile between the cover and the bowl.

Conveniently, this can be an engaging profile diametrically opposite the single latch and aperture, so that when the latch is engaged with the aperture, the engaging profile diametrically opposite the latch and aperture prevents upward movement of the cover so that it is secured, and when the latch is disengaged from the aperture and the cover lifted slightly, the engaging profile permits the cover to be lifted and raised on the side where the latch is, while pivoting around the engaging profile, until the engaging profile too disengages and the cover can be entirely removed. Another possible arrangement would be to replace this engaging profile with a permanent hinge, so that the cover can be pivoted between an open and a closed position.

Referring back to FIG. 2, the pet feeder may be programmed via a control interface 15 on the main body. A display screen 16 allows the user to check the programmed parameters, and may display other information such as the current time, the time of the next feeding and so on.

A pet can, by random pressing of buttons, sometimes cause a pet feeder to become reprogrammed, or turned off. It is advantageous to position the user interface on the main body 10, and to shape the cover 20, such that the user interface 15 (shown in FIG. 2) is rendered completely concealed and inaccessible by the cover, when the cover is fitted to the main body. An aperture 23 in the cover allows the display 16 to be seen when the cover is positioned. By this simple arrangement, the user interface 15 can no longer be interfered with by the pet, or indeed by a user when moving the pet feeder, though the display 16 can still be seen. To access the user interface to alter the pet feeding program or turn the device on or off, the user simply releases the cover in the manner previously described.

It will be seen that numerous variations of a pet feeder using the principles disclosed herein could be implemented. Although in the described embodiments, the bowl is rotated under a cover, equally the cover could be rotated over the bowl, with the notch or similar being borne on the cover instead of the bowl. Rather than a notch in a continuous band of material, a tab could be used, the tab blocking an LED signal rather than being exposed by the notch. Rather than the use of the two edges of a single notch, two notches (or two tabs) could be used.

Although the described embodiments employ an LED and opto sensor, other types of sensor could be employed to detect when the bowl reaches the required position, such as a light absorbent line, a reflective line, or using different sensors, a mechanical trip, or magnetic or electrical position indicator and so on.

The invention claimed is:

1. An automatic pet feeder comprising:
a base including a bowl with a plurality of compartments;
a cover having a top and an integral sidewall depending from the top to cover the bowl;
the sidewall having a bottom edge, and being provided with at least one through aperture above the bottom edge of the sidewall;
the base having at least one latch that co-operates with the at least one through aperture of the sidewall, the at least one latch having a lower lip that catches against a lower edge of the at least one through aperture when the cover is in a first position, preventing removal of the cover;
the top of the cover being depressible to a second position in which the lower edge of the at least one through aperture in the sidewall is lowered, so that the lower lip of the at least one latch is clear of the lower edge of the at least one through aperture; and the at least one latch being capable of being pressed inwardly of the through aperture when the cover is in the second position;

whereby the cover can be removed from the base by first depressing the top of the cover and then pressing the at least one latch inwardly of the sidewall.

2. An automatic pet feeder according to claim 1, wherein the at least one latch includes a curved upper surface, such that when the removed cover is placed over the base, the bottom edge of the cover bears against the curved surface and causes the at least one latch to move inwardly to allow the cover to be fitted to the base until the at least one latch springs out through the at least one through aperture to lock the cover.

3. An automatic pet feeder according to claim 1, wherein the cover includes two apertures, and the base includes two latches.

4. An automatic pet feeder according to claim 3, wherein the two apertures are situated on opposite sides of the pet feeder, and the two latches are situated on opposite sides of the pet feeder.

5. An automatic pet feeder according to claim 1, wherein the cover includes one or more depressions to guide the user as to where to apply force in pressing the cover downwards.

6. An automatic pet feeder according to claim 1, wherein the base includes an interface through which operation of the automatic pet feeder may be programmed; and wherein the cover prevents access to the interface when fitted to the base.

* * * * *